(12) United States Patent
Said et al.

(10) Patent No.: US 8,378,644 B2
(45) Date of Patent: Feb. 19, 2013

(54) ACTIVE RECTIFICATION FOR A VARIABLE-FREQUENCY SYNCHRONOUS GENERATOR

(75) Inventors: Waleed M. Said, Rockford, IL (US); Si Jian Fang, Carpentersville, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 740 days.

(21) Appl. No.: 12/549,466

(22) Filed: Aug. 28, 2009

(65) Prior Publication Data

US 2011/0050184 A1 Mar. 3, 2011

(51) Int. Cl.
*H02P 11/00* (2006.01)
*H02P 9/00* (2006.01)

(52) U.S. Cl. ............................................. 322/44; 322/24

(58) Field of Classification Search ................... 322/44, 322/87, 24; 363/37, 39; 318/701
See application file for complete search history.

(56) References Cited

U.S. PATENT DOCUMENTS

| | | | | |
|---|---|---|---|---|
| 5,384,527 A * | 1/1995 | Rozman et al. | ................. | 322/10 |
| 5,495,162 A * | 2/1996 | Rozman et al. | ................. | 322/10 |
| 5,920,162 A * | 7/1999 | Hanson et al. | ........... | 318/400.04 |
| 6,850,426 B2 | 2/2005 | Kojori et al. | | |
| 7,446,498 B2 | 11/2008 | Cheng et al. | | |
| 2003/0218887 A1* | 11/2003 | Kojori et al. | .................... | 363/16 |
| 2008/0116857 A1* | 5/2008 | Sasaki | ............................. | 322/22 |
| 2010/0164428 A1* | 7/2010 | Xu et al. | ....................... | 318/767 |

* cited by examiner

*Primary Examiner* — Julio Gonzalez
(74) *Attorney, Agent, or Firm* — Kinney & Lange, P.A.

(57) ABSTRACT

An active rectifier controller decouples measurements of the phase and speed of a variable frequency synchronous generator from measurements of the AC output voltage. The active rectifier controller receives position information representative of the rotor position of the VFSG independent of a load connected to the VFSG that is used to determine the phase position and speed of the VFSG. Based on measurements of the generator speed and phase, the active rectifier controller controls the active rectifier to draw AC currents in-phase with the back-electromotive force (BEMF) voltage of the VFSG.

17 Claims, 10 Drawing Sheets

ACTIVE RECTIFICATION FOR A VARIABLE-FREQUENCY SYNCHRONOUS GENERATOR

BACKGROUND

The present invention is related to power conversion, and in particular to a system and method for the efficient control of a power converter.

Converters are commonly employed to convert electrical energy from alternating current (AC) form to direct current (DC) form, or vice versa. In many applications, AC power is provided by a source and converted (i.e., rectified) to DC power for consumption by a load. To improve the power factor of the AC-to-DC conversion, active rectifiers are employed that include switches that are rapidly turned ON and OFF to ensure the current drawn by the active rectifier is sinusoidal and in-phase with the voltage provided by the AC source. Prior art active rectifier controllers use the AC output voltage of the generator as a reference and generate the control signals to maintain the AC current drawn by the rectifier in-phase with the AC output voltage (i.e., unity power factor). This type of control works well for applications in which the AC source, such as the power grid, is stable (i.e., the voltage is not significantly affected by the power drawn by an attached load). For example, high-frequency switching of the active rectifier does not significantly affect the AC output voltage provided by this stable AC source. Variable frequency synchronous generators (VFSG), such as those employed in aerospace applications, typically operate at or near their maximum rated power and frequency capability and exhibit an output impedance. Application of a load such as a high-frequency active rectifier to a VFSG exhibiting output impedance results in disturbances of the output voltage and consequently a phase shift between the output voltages of the VFSG and the back-electromotive force (BEMF) of the VFSG. Prior art methods that control a high-frequency active rectifier such that the current drawn by the rectifier is in-phase with the monitored output voltage results in the BEMF voltage of the VFSG being out of phase with the current provided by the VFSG. As a result, the overall efficiency of the VFSG (i.e., the power factor) becomes less than optimal.

SUMMARY

An active rectifier controller controls the operation of an active rectifier in converting the alternating current (AC) output voltage provided by a variable frequency synchronous generator (VFSG) to a direct current (DC) output voltage while maintaining AC current drawn from the VFSG in-phase with the rotor position of the VFSG (i.e., in-phase with the main AC stator voltage or back electromotive force (BEMF) as opposed to the AC output voltage provided by the VFSG). The controller includes a first input for receiving position information representative of the rotor position of the VFSG independent of the load connected to the VFSG, a second input connectable to monitor a direct current (DC) output voltage of the active rectifier, and a third input connectable to monitor AC currents drawn by the active rectifier. The controller further includes a phase/speed detector, a voltage regulator and a current regulator. The phase/speed detector determines rotor position and speed of the VFSG based on the received position information. The voltage regulator generates a current command based on the monitored DC output voltage and determined speed of the VFSG. The current regulator generates the pulse width modulation (PWM) control signals based on the current command provided by the voltage regulator, the monitored AC currents, and determined rotor position and speed of the VFSG provided by the phase/speed detector such that the AC current drawn by the active rectifier remains in-phase the rotor position of the VFSG.

DETAILED DESCRIPTION

The present invention provides an active rectifier controller that decouples detection of the position of the AC generator from the monitored AC output voltage of the generator, which is distorted by the high-frequency switching of the active rectifier. In particular, the active rectifier controller of the present invention obtains phase and speed information from sources other than the AC output voltage provided by the generator. In one embodiment, the active rectifier controller monitors the permanent magnet generator (PMG) voltage, which is synchronized with the main stator winding via the rotating magnetic field provided by the exciter. The PMG output voltage is rectified and provided as a DC input to the exciter stator portion, but is not the main output of the generator. As such, high-frequency switching of the active rectifier does not affect the phase of the PMG output stator voltage, but position and phase information can be detected based on the monitored frequency and phase of the PMG output stator voltage. In another embodiment, the active rectifier controller receives input from a resolver connected to monitor the rotor position of the generator. Once again, high-frequency switching of the active rectifier does not affect the position information obtained from the mechanical rotor position of the generator. In this way, position (i.e., phase) and speed information are obtained without reliance on the AC output voltage provided by the generator.

Figure 1A:
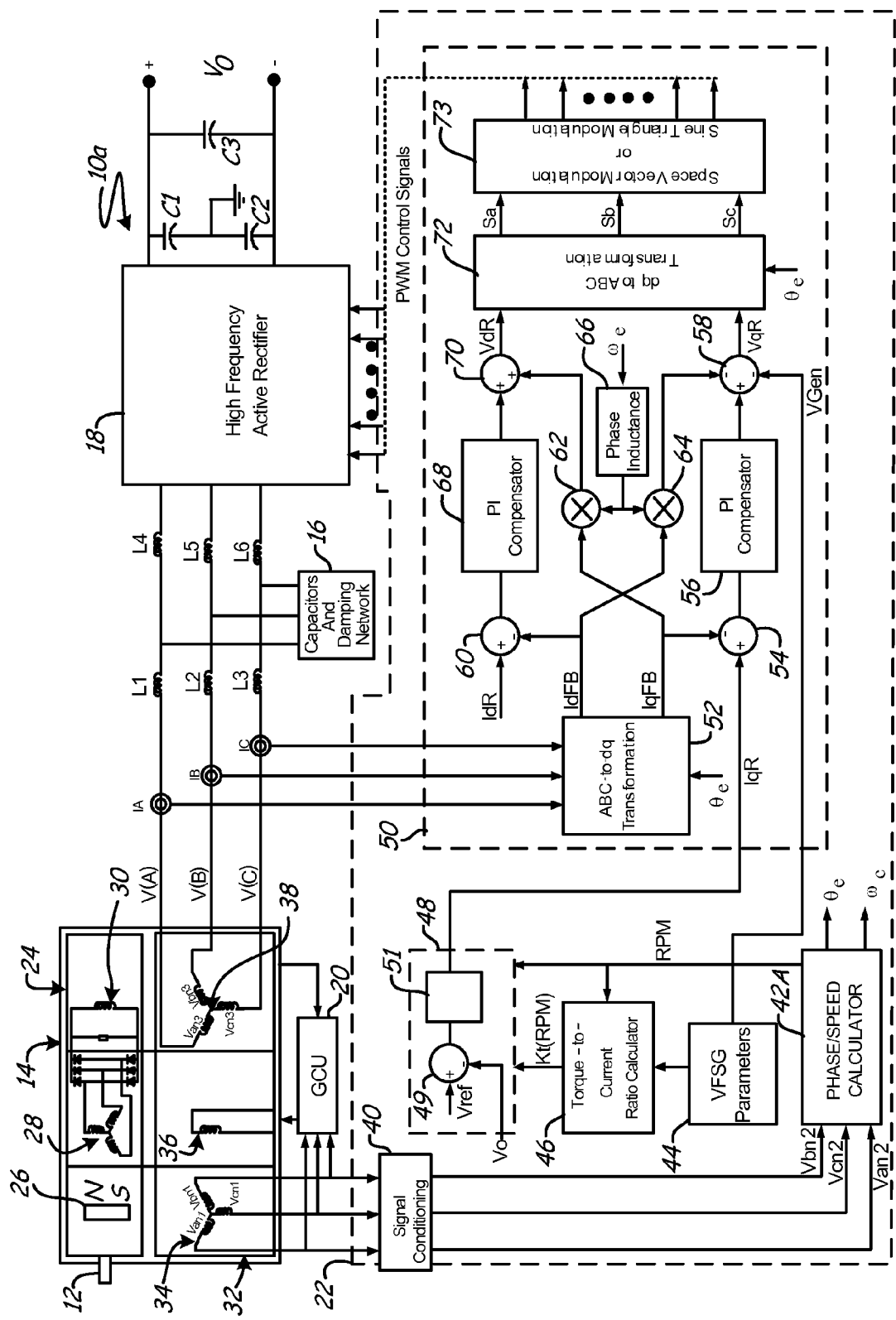
FIGS. 1A and 1B are block diagrams of power generation/conversion systems according to embodiments of the present invention.
Figure 1B:
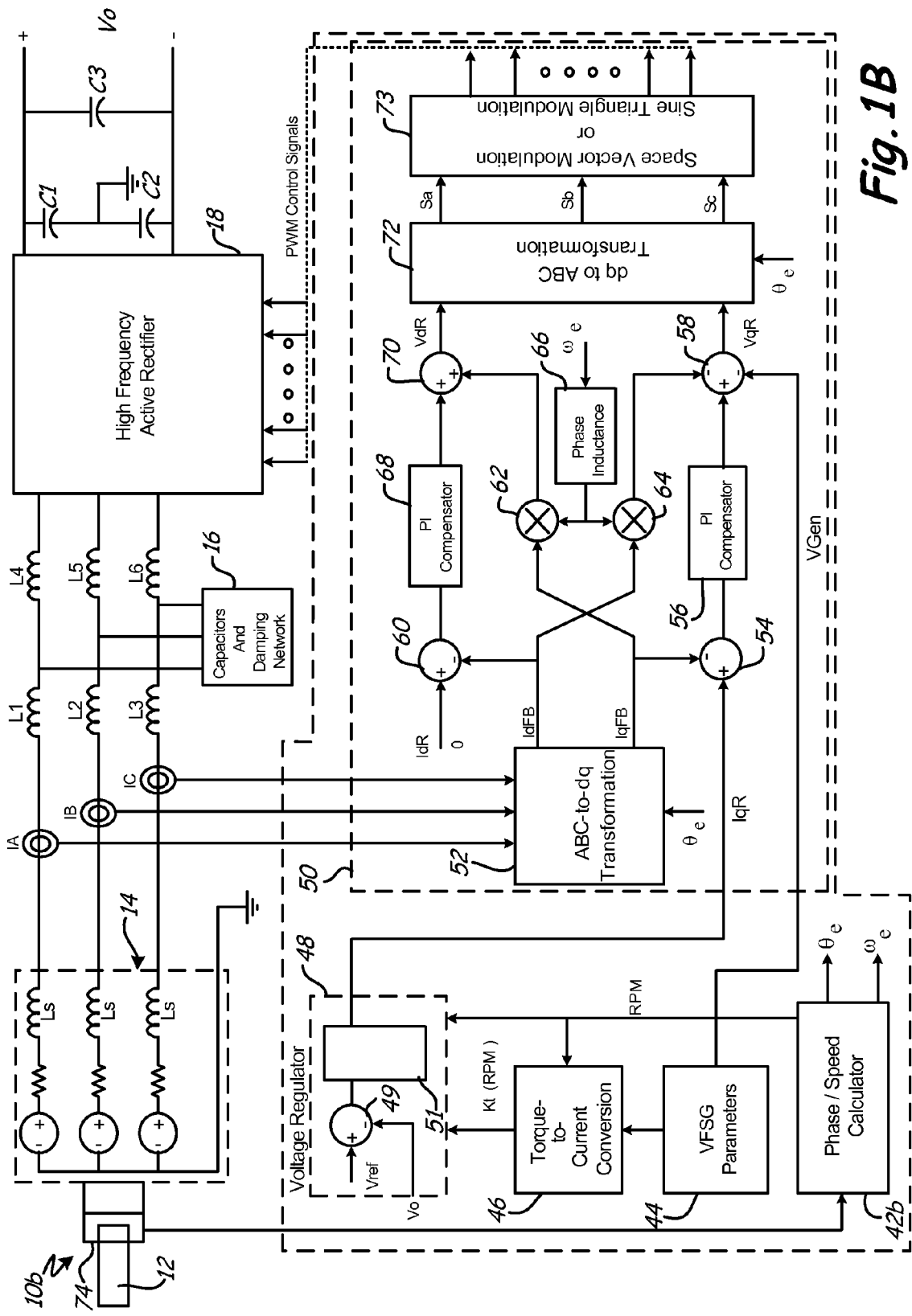

FIGS. 1A and 1B are block diagrams of power generation systems 10a and 10b according to an embodiment of the present invention. In both embodiments, power generation systems 10a and 10b include shaft 12 coupled with a prime mover (not shown), variable frequency synchronous generator (VFSG) 14, capacitors and damping network 16, high-frequency active rectifier 18, generator control unit (GCU) 20, and active rectifier controller 22.

VFSG 14 includes a rotor portion 24—which includes permanent magnet portion 26, exciter rotor portion 28 and main field rotor portion 30—and stator portion 32—which includes PMG stator coils 34, exciter stator portion 36, and main field stator windings 38. Prime mover 12 provides mechanical energy to rotor portion 24, causing permanent magnet portion 26, rotor exciter portion 28, and main field rotor portion 30 to rotate. The rotation of permanent magnet portion 26 generates an alternating current (AC) voltage in PMG stator coils 34, labeled Van1, Vbn1, and Vcn1. The outputs of PMG stator coils 34 are provided to GCU 20, which rectifies the AC input and provides a DC excitation current to exciter stator portion 36. Based on the magnitude of the excitation current provided to exciter stator portion 36, exciter rotor portion 28 generates an AC output that is rectified and provided to main field rotor portion 30 to couple the exciter stator current to the main field rotor current by rotation. In response to the rotating field established by main field rotor portion 30, main field stator windings 38 generate a variable frequency (based on the speed of prime mover 12) main AC voltage labeled Van3, Vbn3, and Vcn3. The main AC voltages Van3, Vbn3, and Vcn3 are provided as an output to active rectifier, in which they are labeled AC output voltages V(A), V(B), and V(C). Leakage inductance associated with main field stator windings 38 creates a phase difference between the AC output voltages V(A), V(B) and V(C) and the main AC voltages Van3, Vbn3 and Vcn3 generated on the main field stator windings 38. Inductors L1, L2, L3, L4, L5, and L6, along with capacitors and damping network 16, act to filter and smooth the AC input provided to high-frequency power rectifier 18.

High-frequency active rectifier 18 includes one or more switches associated with each phase of power provided by VFSG 14. The switches are selectively turned ON and OFF by drive signals provided by active rectifier controller 22. In response, high-frequency active rectifier 18 converts the AC input to a DC output voltage Vo provided across capacitor C3.

The efficiency of high-frequency active rectifier 18 is based, in part, on the AC current IA, IB, and IC drawn by rectifier 18 being in-phase with the position of VSFG 14 (i.e., in-phase with main AC stator voltages Van3, Vbn3, and Vcn3). Prior art control schemes determined the phase or position of the generator by monitoring the AC output voltages V(A), V(B), and V(C), and generating control signals to maintain the phase between the AC output voltages and the AC currents IA, IB and IC drawn by high-frequency active rectifier 18. However, for some types of generators—in particular those employed in aerospace applications—the generator is characterized by an output impedance. As a result of the output impedance, high-frequency switching by active rectifier 18 modifies the phase of the AC output voltages V(A), V(B), and V(C) used as the reference for controlling the phase of the current drawn by the rectifier. Modification of the phase of the AC output voltages causes a phase difference between the current drawn by active rectifier 18 and the actual rotor position of VFSG 14 that increases the current required to generate the power requested by an attached load. An illustration of which is provided with respect to FIG. 6, described below.

The present invention seeks to de-couple the control algorithm employed by active rectifier controller 22 from relying on the monitored output voltages V(A), V(B), and V(C) as a reference for the phase of the AC current drawn by active rectifier 18, such that the AC currents IA, IB, and IC are in-phase with the position of the generator (i.e., in-phase with the AC main stator voltages Van3, Vbn3, and Vcn3). For example, in the embodiment shown in FIG. 1A, active rectifier controller 22 receives phase information based on the PMG stator voltages Van1, Vbn1, Vcn1 generated by PMG stator windings 34. The phase of the PMG voltages provided by PMG stator windings 34—as well as the phase of the AC main stator voltages Van3, Vbn3, and Vcn3—are based on the position of prime mover 12. The phase of the AC voltages Van1, Vbn1, and Vcn1 provided by PMG stator windings 34 is therefore representative of the phase of AC main stator voltages output voltages Van3, Vbn3, and Vcn3. Because the AC voltages Van1, Vbn1, and Vcn1 are not provided as an input to active rectifier 18, they are not affected by the high-frequency switching of active rectifier 18.

In the embodiment shown in FIG. 1B, active rectifier controller 22 receives rotor position information from rotor position detector 74 such as a resolver or optical decoder. Based on this information, active rectifier controller 22 is able to determine the phase and speed of VFSG 14, which are representative of the AC main stator voltage Van3, Vbn3, and Vcn3.

Active rectifier controller 22 is responsible for generating the PWM control signals responsible for selectively turning ON and OFF the switches within high-frequency power rectifier 18 to regulate the output voltage Vo provided by high-frequency active rectifier 18. In the embodiment shown in FIG. 1A, active rectifier controller 22 includes signal conditioner 40, main armature voltage phase lock and rotor speed conversion ("phase/speed detector") 42a, generator parameter storage/memory 44, torque to current converter 46, and voltage regulator 48. Signal conditioner 40 receives the monitored voltages Van1, Vbn1, and Vcn1 generated by PMG stator windings 34 and conditions the signals such that they are usable by active rectifier controller 22 (conditioned signals are labeled Van2, Vbn2, and Vcn2). Based on the conditioned PMG stator voltages Van2, Vbn2, and Vcn2, phase/speed detector 42a calculates the electrical frequency $\omega_e$ associated with VFSG 14, the electrical angular position $\theta_e$ of VFSG 14, and the mechanical speed (expressed in revolutions-per-minute (RPM)) of VFSG 14. An exemplary embodiment of the function performed by phase/speed detector 42a is described below with respect to FIG. 2. Similarly, phase/speed detector 42b, shown in FIG. 1B, calculates the electrical frequency $\omega_e$ associated with VFSG 14, the electrical angular position $\theta_e$ of VFSG 14, and the mechanical speed (expressed in revolutions-per-minute (RPM)) of VFSG 14 based on rotor position information provided by rotor position detector 74.

The calculated electrical phase $\theta_e$ of the generator is provided to current regulator 50, which employs the phase position information to accurately convert the monitored current from a three-phase stationary reference frame to a two-phase rotating reference frame that simplifies the control operations. Accurate measurement or calculation of electrical phase $\theta_e$ improves this conversion and thus improve the AC-to-DC conversion. The calculated electrical frequency $\omega_e$ is similarly provided to current regulator 50, which employs the electrical frequency to determine the effect phase inductance will have on the AC main stator voltages Van3, Vbn3, and Vcn3. Finally, the mechanical speed RPM is employed by voltage regulator 48 to allow for accurate control of the monitored output voltage Vo.

Parameter storage/memory 44 stores parameters associated with the operation of VFSG 14. These parameters allow active rectifier controller 22 to account for non-linearities in the operation of VFSG 14 at various speeds. In one embodiment, parameter storage/memory 44 stores parameters, such as maximum generator output power rating Pmax, the generator output voltage Vgen in the constant power region, the back electromotive force (BEMF) constant KE in the constant torque region, and number of poles associated with VFSG 14. Parameter storage/memory 44 may include plots, data points, etc., that act to map these parameters at various speeds. This information is employed by torque-to-current ratio calculator 46, in combination with mechanical speed information RPM provided by phase/speed detector 42, to determine the torque-to-current ratio Kt(RPM), as described in more detail with respect to FIGS. 3 and 4A-4B.

Voltage regulator 48 employs the torque-to-current ratio Kt(RPM) to calculate the current command IqR required to generate the desired output voltage Vo. Voltage regulator 48 seeks to minimize the difference between the DC output voltage Vo and a reference voltage Vref. To this end, the reference voltage Vref is compared with the monitored output voltage Vo by difference block 49. The difference between the reference voltage Vref and the monitored output Vo is employed by feedback controller 51 to generate a current command required to generate the desired DC output voltage. An exemplary embodiment of the operations performed by controller 51 is described below with respect to FIG. 5.

Current regulator 50 compares the current command IqR provided by voltage regulator 48 with monitored currents IA, IB, and IC drawn by high-frequency active rectifier 18 to determine the pulse-width modulated (PWM) signals to be provided to the rectifier. Current regulator 50 includes ABC-to-dq transformer 52, error block 54, proportional-integral (PI) compensator 56, comparator 58, error block 60, multipliers 62 and 64, phase inductance block 66, PI compensator 68, summer block 70, dq-to-ABC transformation block 72, and PWM generator 73. The operation of current regulator 50 is well-known in the art. ABC-to-dq transformation block 52 converts the monitored feedback currents IA, IB, and IC from the standard reference frame to a rotating reference frame (dq), based on the angular position $\theta_e$ provided by phase/speed detector 42. The resultant currents IqFB and IdFB (represented in the two-phase rotating reference frame) from block 52 are compared with commanded current values by error blocks 54 and 60, respectively. Power factor or conversion efficiency is maximized when the d-axis current is equal to zero, as indicated by the comparison of the monitored d-axis current IdFB with a current command equal to zero. The monitored q-axis current IqFB is compared with the current command IqR provided by voltage regulator 48. The errors generated by error blocks 54 and 60 are provided to PI compensators 56 and 68, respectively, which generate an output that seeks to minimize the difference between the monitored and commanded current values.

The outputs of PI compensators 56 and 68 are converted to voltage command signals VqR and VdR, respectively, by summer blocks 58 and 70, respectively. In each case, voltage differences attributable to phase inductance are accounted for based on the electrical frequency $\omega_e$ and monitored current values. The dq-to-ABC transformer 72 converts the voltage command signals VdR and VqR from the two-phase rotating reference frame to the three-phase stationary reference frame. PWM generator 73 converts the commanded voltages Sa, Sb, and Sc to pulse-width modulated signals that are provided to selectively control active components employed by high-frequency active rectifier 18. In response to the provided PWM signals, high-frequency active rectifier 18 converts the AC input provided by VFSG 14 to a DC output voltage Vo.

As described above, calculating phase and speed information based on the AC voltages generated by PMG stator windings 34 allows the present invention to de-couple noise and phase delay problems from the AC output voltages V(A), V(B), and V(C). This de-coupling negates factors such as source impedance that modifies the phase of the AC output voltage and would therefore modify the calculated phase and speed information. As a result, the currents IA, IB, and IC drawn by rectifier 18 are controlled to be in-phase with the position of the generator (i.e., the phase of the AC main stator voltages Van3, Vbn3, and Vcn3).

Figure 2:
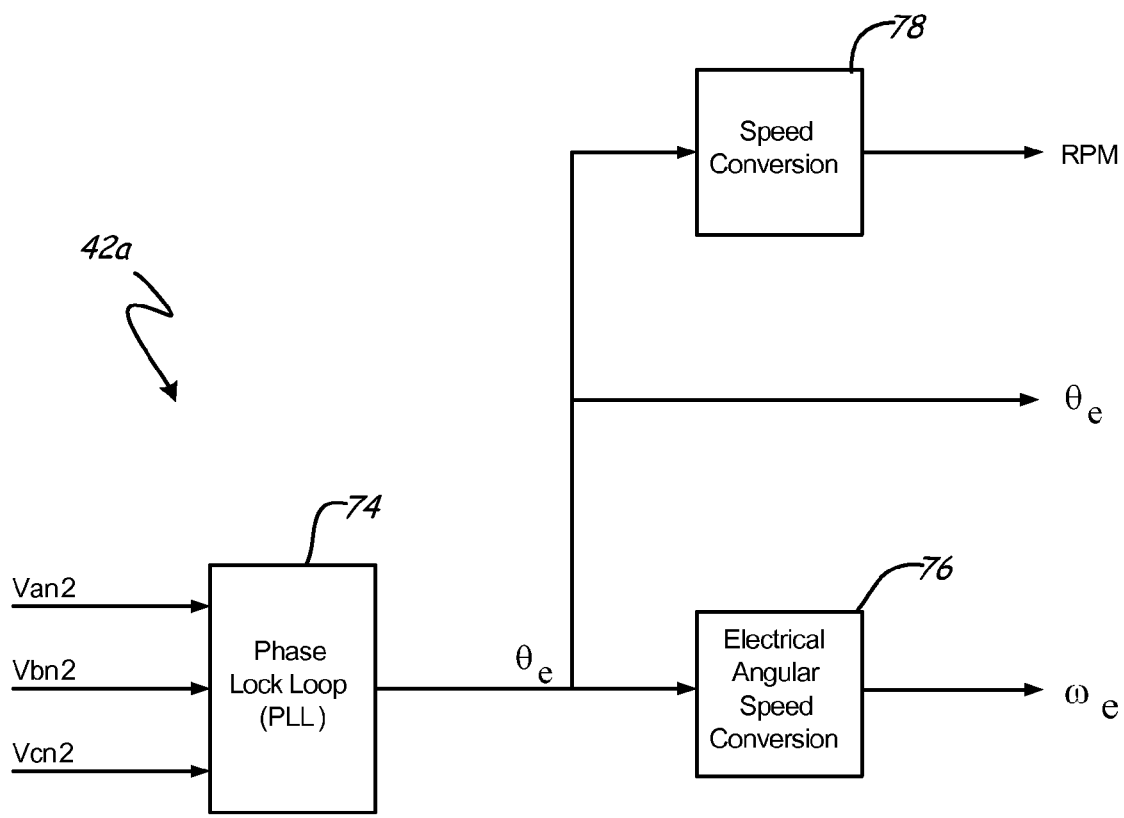
FIG. 2 is a block diagram illustrating operations performed by a phase/speed detector according to an embodiment of the present invention.

FIG. 2 is a block diagram illustrating operations performed by phase/speed detector 42a according to an embodiment of the present invention. In this embodiment, phase/speed detector 42a includes phase lock loop (PLL) 74, electrical angular speed converter 76 and mechanical speed converter 78. PLL 74 detects the phase of the monitored AC voltages Van2, Vbn2, Vcn2 generated by PMG stator windings 34, and calculates in response an electrical angular position $\theta_e$ that represents the position of rotor portion 24. Electrical angular speed converter 76 calculates based on the detected position $\theta_e$ over a defined period of time the electrical angular frequency $\omega_e$. Speed converter 78 also calculates—based on the detected angular position $\theta_e$ over a defined period of time—the revolutions-per-minute (RPM) associated with VFSG 14. Outputs provided by phase/speed detector 42a therefore include mechanical speed RPMs, electrical angular position $\theta_e$, and electrical angular frequency $\omega_e$.

Figure 3:
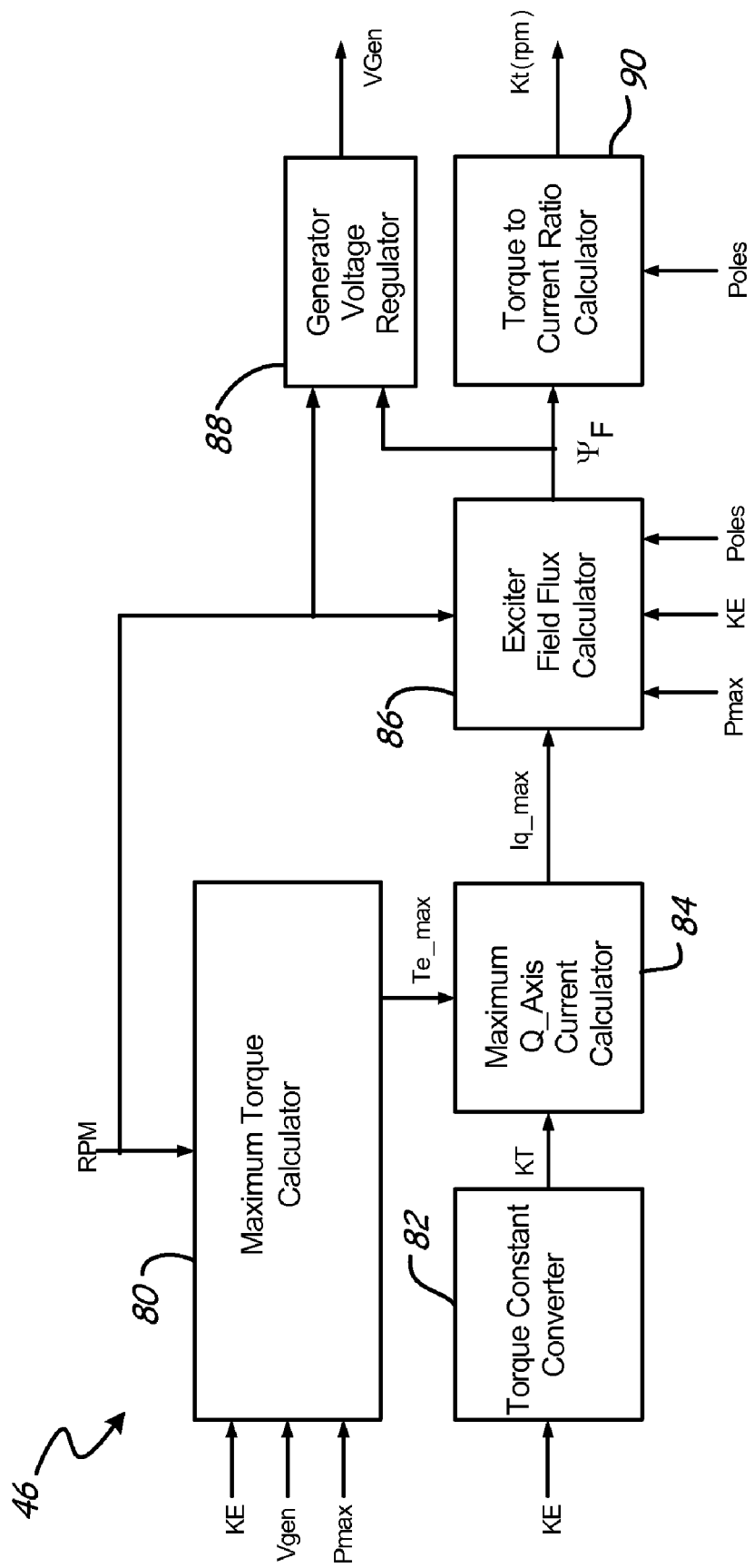
FIG. 3 is a block diagram illustrating operations performed by torque-to-current ratio calculator for calculating a torque-to-current value according to an embodiment of the present invention.
Figure 4A:
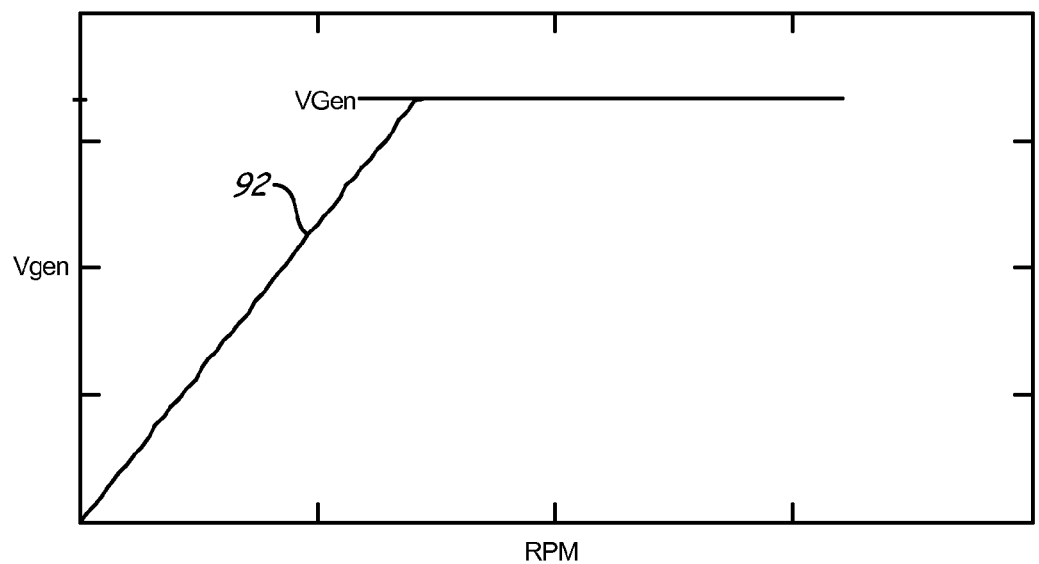
FIGS. 4A and 4B are graphs that illustrate non-linearities associated with the generator.
Figure 4B:
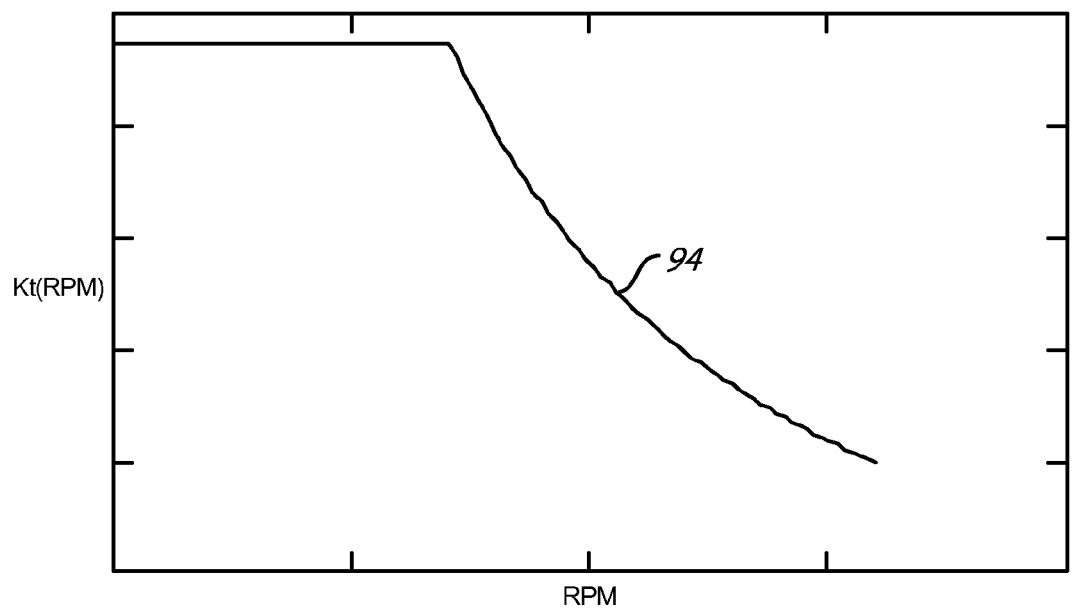

FIG. 3 is a block diagram illustrating operations performed by torque-to-current ratio calculator 46 according to an embodiment of the present invention. Torque-to-current ratio converter 46 includes maximum torque calculator 80, torque constant convertor 82, maximum q-axis current calculator 84, exciter field flux calculator 86, generator voltage regulator 88, and torque-to-current ratio calculator 90. Calculating the torque constant Kt(RPM) allows voltage regulator 48 (shown in FIGS. 1A and 1B) to account for non-linearities associated with VFSG 14. These non-linearities are illustrated in FIGS. 4A and 4B by graphs 92 and 94, which illustrate how the generator output voltage (referred to collectively as Vgen) varies with speed (i.e., RPM) and how the torque-to-current ratio Kt(RPM) varies with speed (i.e., RPM). With respect to graph 92, the generator output voltage $VGen_k$ increases with increasing speed until a threshold value is reached, at which point the generator voltage $VGen_k$ remains constant despite subsequent increase in speed. The stored parameter value VGen represents the generator output voltage in this constant power region. With respect to graph 94, the non-linear torque-to-current ratio Kt(RPM) is constant at low mechanical speeds and decreases—non-linearly—as the mechanical speed increases. Mapping of parameters associated with various speeds of VFSG 14 allows torque-to-current ratio calculator 46 to accurately calculate the torque-to-current ratio associated with VFSG 14 at various speeds of the generator.

In particular, maximum torque calculator 80 receives stored generator parameters such as BEMF constant KE in the constant torque region, generator output voltage Vgen in the constant power region, and the maximum generator power output Pmax. The mechanical speed (provided in RPMs) of VFSG 14 is provided by phase/speed detector 42a or 42b (as shown in FIGS. 1A, 1B, respectively). Maximum torque calculator 80 calculates, based on the generator parameters and mechanical speed, the maximum torque Te_max available of the generator. Torque constant converter 82 generates a torque-to-current constant value KT based on the BEMF constant associated with the constant torque region (i.e., illustrated in FIG. 4B by the flat portion of the line at low RPMs). The torque-to-current ratio constant KT and maximum torque Te_max are employed by maximum q-axis current calculator 84 to calculate the maximum q-axis current Iq_max—which represents the maximum current that can be drawn by active rectifier 18 if no d-axis current is drawn at the given speed.

Exciter field flux calculator 86 receives the calculated maximum q-axis current Iq_max and speed information RPM. Based on these inputs, as well as the generator output power rating Pmax, the BEMF constant in the constant torque region KE, and the number of poles associated with VFSG 14, exciter field flux calculator 86 estimates the exciter field flux Ψf. The exciter field flux estimate takes into account the increasing BEMF at increased speeds of the generator. The flux estimate Ψf is provided to torque-to-current ratio calculator 90, which calculates the torque-to-current ratio based on the estimated field flux Ψf and the number of poles associated with the generator. The mechanical speed RPM and exciter field flux Ψf are also provided to generator voltage regulator 88 to calculate the generator output voltage VGen$_k$ (not to be confused with the generator parameter Vgen that represents the generator output voltage in the constant power region). The generator output voltage VGen$_k$ represents the actual output voltage generated by VFSG 14 as a function of speed. Torque to current ratio calculator 90 calculates the torque-to-current ratio Kt(RPM) as a function of speed based on the exciter field flux Ψf and parameter information such as the number of poles. In this way, both the generator output voltage VGen$_k$ and torque-to-current ratio Kt(RPM)—which vary based on the speed of the generator as shown graphs 92 and 94, respectively—are more precisely known. This allows subsequent control of the output voltage Vo to be more precisely controlled.

Figure 5:
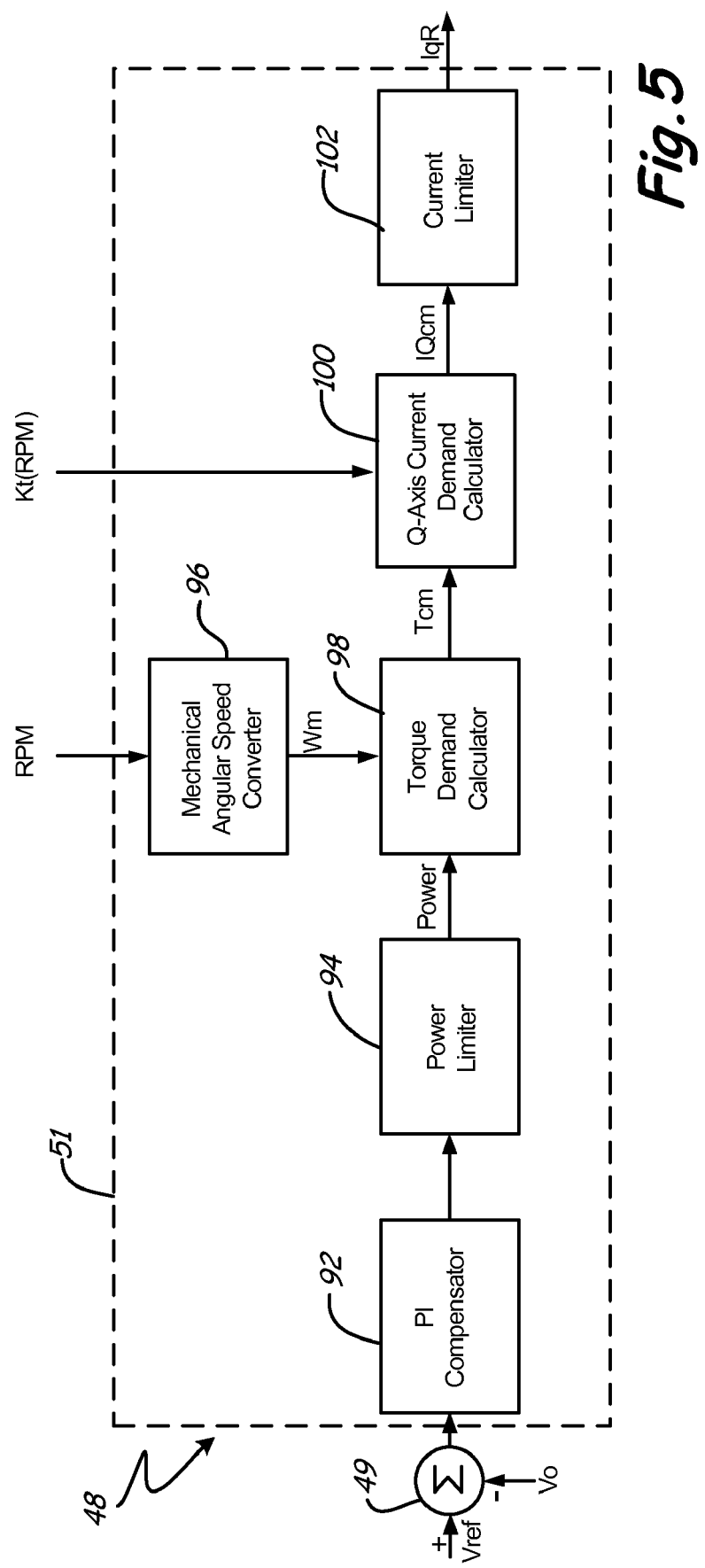
FIG. 5 is a block diagram that illustrates operations performed by voltage regulator in calculating a q-axis current command to decouple non-linear characteristics of the system according to an embodiment of the present invention.

FIG. 5 is a block diagram that illustrates operations performed by voltage regulator 48 in calculating the q-axis current command IqR according to an embodiment of the present invention. As discussed with respect to FIG. 1, voltage regulator 48 compares the monitored output voltage Vo with a reference voltage Vref. The difference between the reference voltage and the monitored output voltage is provided to proportional-integral (PI) compensator 92, which generates an output that seeks to minimize the difference. Power limiter 94 receives the output generated by PI compensator 92 and generates a power estimate that reflects the capabilities of VFSG 14. Mechanical angular speed converter 96 converts the mechanical speed of VFSG 14 from RPMs to a mechanical angular value Wm that is provided to torque demand calculator 98. Based on the mechanical angular speed Wm and the calculated power required based on the comparison of the reference voltage Vref to the monitored output voltage Vo, torque demand calculator 98 calculates the torque demand Tcm required to generate the desired output voltage. Q-axis current demand converter 100 generates in response to the provided torque demand Tcm the q-axis current demand IQcm Converter 100 employs the torque-to-current ratio Kt(RPM), as described with respect to FIG. 3, to accurately calculate the q-axis current demand IQcm required to generate the desired output voltage. Current limiter 102 ensures the current command does not exceed limited values. The output of current limiter 102 is the current command IqR that is provided to current regulator 50, as described with respect to FIG. 1.

In this way, the active rectifier controller of the present invention maintains the phase of the AC current drawn by the active rectifier in-phase with BEMF voltage of the variable frequency synchronous generator, thereby maximizing the efficiency of the power conversion system.

Figure 6A:
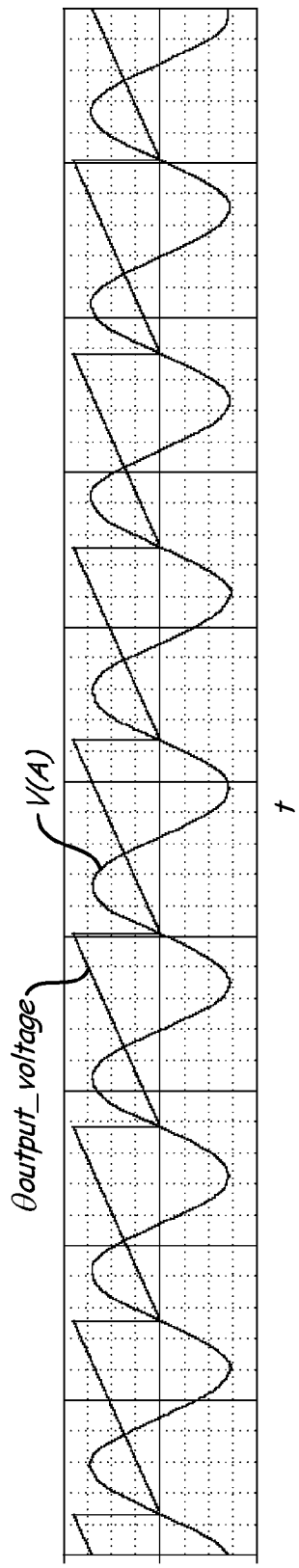
FIGS. 6A-6D are waveform graphs illustrating operation of prior art active rectifier controllers.
Figure 6B:
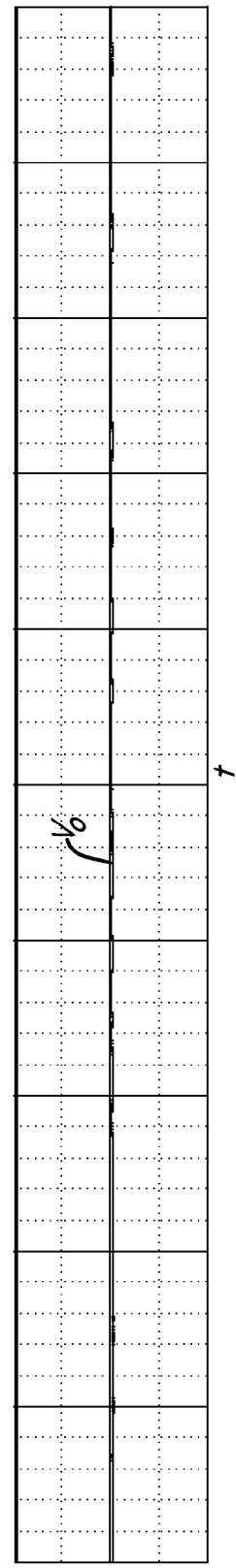
Figure 6C:
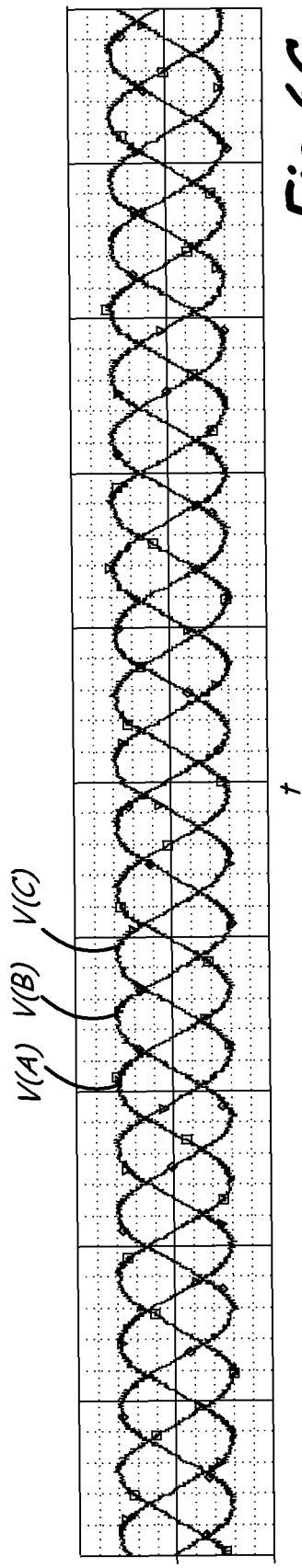
Figure 6D:
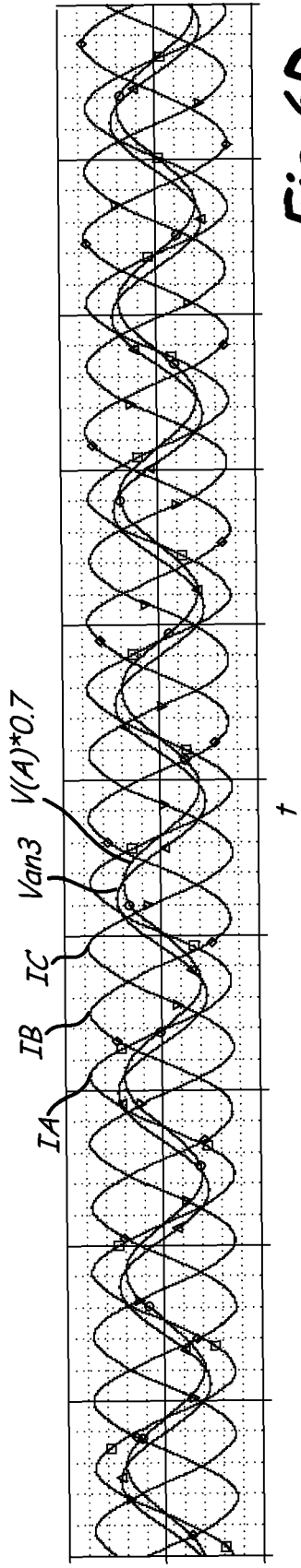

FIGS. 6A-6D are waveform graphs illustrating operation of prior art power conversion systems and FIGS. 7A-7D are waveform graphs illustrating the improved operation of the power conversion system according to an embodiment of the present invention. FIG. 6A illustrates the calculation of an angular position θ$_{output\_voltage}$ using a phase lock loop as known in the prior art, in which the phase position is based on the monitored output voltage V(A). FIG. 6B illustrates the regulated DC output voltage Vo generated by the active rectifier as known in the prior art, and FIG. 6C illustrates the generator output voltages V(A), V(B), and V(C) generated by the VFSG generator as known in the prior art. FIG. 6D represents illustrates the generator output currents IA, IB, and IC—each controlled to be in-phase with the generator output voltages V(A), V(B), and V(C) as shown in FIG. 6C with total harmonic distortion of 1.38%. However, source impedance of the generator results in the back electromotive force (BEMF) generated in the main stator winding of a generator—illustrated here by AC main stator voltage Van3—being phase-shifted relative to the respective generator output voltage V(A). Because the active rectifier is controlled to maintain the output currents (IA, IB, and IC) in phase with the generator output voltages (V(A), V(B), and V(C), respectively), the output currents are not in-phase with the BEMF voltages (Van3, Vbn3, and Vcn3, respectively), resulting in poor power factor performance. As a result, the generator is operating at less than optimal efficiency.

Figure 7A:
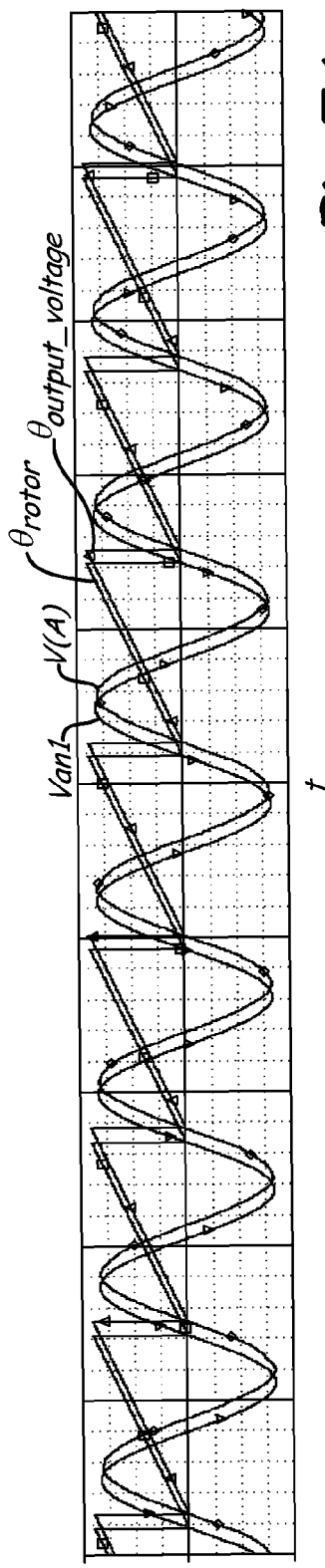
FIGS. 7A-7D are waveform graphs illustrating operation of active rectifier controller according to an embodiment of the present invention.
Figure 7B:
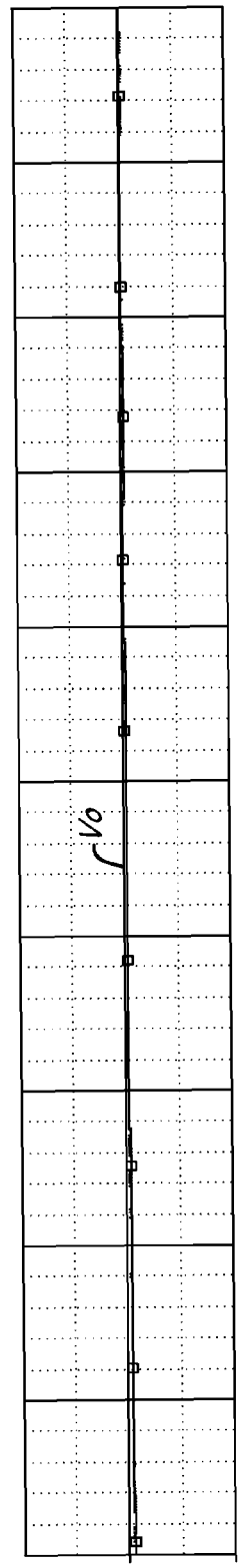
Figure 7C:
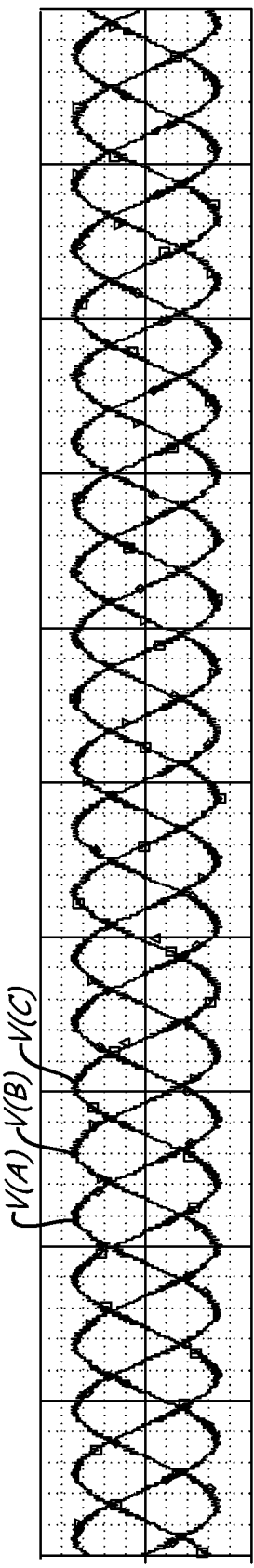

FIGS. 7A-7D are waveform graphs illustrating operation of active rectifier controller according to an embodiment of the present invention. FIG. 7A illustrates the calculation of a phase position θ$_{rotor}$ based on rotor position—either based on sampling of the PMG output voltage Van1, Vbn1, and Vcn1 as shown in FIG. 1A or based on rotor position information provided by an rotor position detector as shown in FIG. 1B. FIG. 7A also illustrates the prior art method of calculating phase position based on the generator output voltage V(A), as illustrated by the line labeled θ$_{output\_voltage}$. FIG. 7B illustrates the DC output voltage Vo generated by active rectifier 18 according to the present invention. FIG. 7C illustrates the AC output voltages V(A), V(B), and V(C) generated by VFSG 14 according to the present invention.

Figure 7D:
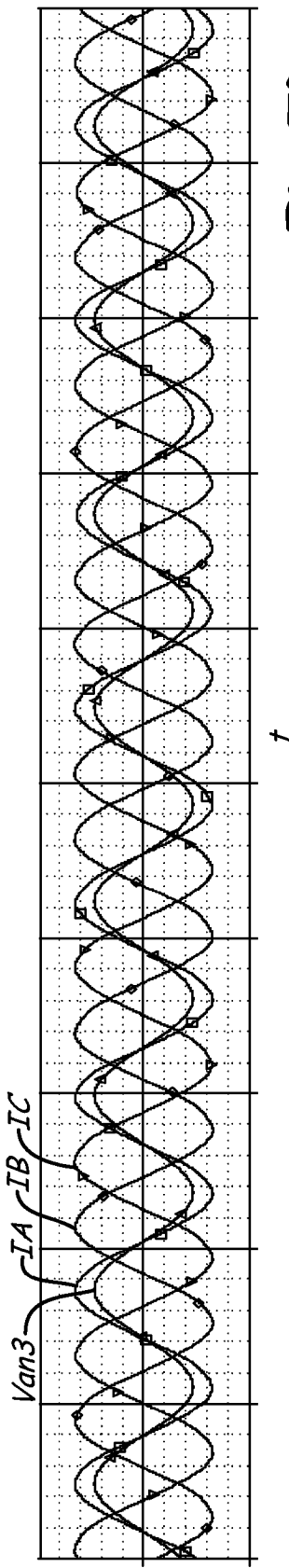

FIG. 7D illustrates the resulting AC currents IA, IB, and IC drawn by active rectifier 18 as well as the back electromotive force (BEMF) generated in stator main winding 38—labeled here Van3. In particular, deriving a position reference from the position of the rotor, as opposed to the position of AC output voltage, allows active rectifier controller to maintain the AC output currents IA, IB, and IC drawn by the active rectifier in-phase with the BEMF voltage of the generator (i.e., generator output currents IA, IB, and IC are in-phase with the main generator armature voltages Van3, Vbn3, and Vcn3). That is, calculating the current command without reliance on the monitored AC generator voltages V(A), V(B), and V(C) for phase information decouples the control of the AC current drawn by active rectifier 18 from switching noise of AC output voltages V(A), V(B), and V(C) and associated filtering delays, result in improved power factor efficiency of the generator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An active rectifier controller that controls the operation of an active rectifier in converting main alternating current (AC) voltage from a generator to a direct current (DC) output voltage while maintaining AC current drawn from the generator in phase with back electromotive force (BEMF) voltage of the generator, the controller comprising:

a first input for receiving position information representative of the rotor position of the generator independent of a load connected to the generator;
a phase/speed detector that determines phase position and speed of the generator based on the received rotor position information;
a second input connectable to monitor a direct current (DC) output voltage of the active rectifier;
a voltage regulator that generates a current command based on the monitored DC output voltage and determined speed of the generator;
a third input connectable to monitor AC currents drawn by the active rectifier; and
a current regulator that generates PWM control signals based on the current command provided by the voltage regulator, the monitored AC currents, and determined rotor position and speed of the generator provided by the phase/speed detector such that the AC current drawn by the active rectifier remains in-phase with BEMF voltage of the generator.

2. The active rectifier controller of claim 1, wherein the rotor position information received by the first input includes monitored permanent magnet generator (PMG) voltages generated in stator coils associated with a permanent magnet generator portion of the generator.

3. The active rectifier controller of claim 2, wherein the phase/speed detector determines the rotor position and speed of the generator based on the monitored PMG voltages.

4. The active rectifier controller of claim 1, wherein the position information received by the first input includes shaft position input provided by a rotor position detector mounted to monitor position of a shaft connected to the generator.

5. The active rectifier controller of claim 4, wherein the phase/speed detector determines the rotor position and speed of the generator based on the shaft position input provided by the rotor position detector.

6. The active rectifier controller of claim 1, further including:
a torque-to-current ratio calculator that employs stored generator parameters in combination with the determined speed of the generator to calculate a torque-to-current ratio as a function of speed associated with the generator.

7. The active rectifier controller of claim 6, wherein the stored generator parameters includes a maximum generator output power rating, a constant power region generator output voltage value, a constant torque region back electromotive force (BEMF) constant, and number of poles associated with the generator.

8. The active rectifier controller of claim 6, wherein the voltage regulator employs the calculated torque-to-current ratio and the determined speed of the generator to decouple nonlinear characteristics of the system and to calculate the current command required to regulate the desired DC output voltage.

9. A method of controlling an active rectifier to maintain the current drawn by the active rectifier in-phase with the rotor position of the generator, the method comprising:
receiving at a first input receiving position information representative of the rotor position of the generator independent of a load connected to the generator;
determining position and speed information associated with the generator based on the position information received at the first input;
receiving at a second input a monitored DC output voltage generated by the active rectifier;
calculating a torque-to-current ratio associated with the generator based on the determined speed of the generator and stored parameters associated with the generator;
generating a current command based on the monitored DC output voltage, the calculated torque-to-current ratio, and the determined speed of the generator; and
generating control signals provided to the active rectifier based on the current command provided by the voltage regulator.

10. The method of claim 9, wherein the rotor position information received by the first input includes monitored permanent magnet generator (PMG) voltages generated in stator coils associated with a permanent magnet generator portion of the generator.

11. The method of claim 10, wherein determining generator rotor position and speed information associated with the generator is based on the monitored PMG voltages.

12. The method of claim 9, wherein the position information received by the first input includes shaft position input provided by a rotor position detector mounted to monitor position of a shaft connected to the generator.

13. The method of claim 12, wherein the determining position and speed information associated with the generator is based on the shaft position input provided by the rotor position detector.

14. The method of claim 9, wherein the stored parameters include a maximum generator output power rating, a constant power region generator output voltage, a constant torque region back electromotive force (BEMF) constant, and number of poles associated with the generator.

15. A power generation/conversion system comprising:
a variable frequency starter/generator (VFSG) having a permanent magnet generator (PMG) portion, an exciter portion, and a main generator portion that generates an alternating current (AC) output voltage in response to mechanical energy provided by a shaft;
a high-frequency active rectifier connected to convert the AC output voltage provided by the VFSG to a direct current (DC) output voltage;
means for monitoring rotor position information representative of the rotor position of the VFSG independent of a load connected to the VFSG; and
an active rectifier controller for controlling the operation of the high-frequency active rectifier based, in part, on the monitored position information, wherein the active rectifier controller calculates phase position and speed of the VFSG based on the monitored rotor position information and controls the high-frequency active rectifier such that the AC current drawn by the active rectifier remains in-phase with back electromotive force (BEMF) voltages of the VFSG.

16. The power generation/conversion system of claim 15, wherein the means for monitoring position information representative of the rotor position of the VFSG includes:
voltage sensors connected to monitor AC voltages generated in stator coils associated with the PMG portion of the VFSG; and
a phase/speed detector that determines position and speed of the VFSG based on the monitored PMG voltages.

17. The power generation/conversion system of claim 15, wherein the means for monitoring position information representative of the position of the VFSG includes:
a rotor position detector mounted to monitor rotor position of the shaft connected to the VFSG; and
a phase/speed detector that determines position and speed of the VFSG based on the monitored position of the shaft.

* * * * *